(12) United States Patent
Stone

(10) Patent No.: US 7,668,195 B2
(45) Date of Patent: Feb. 23, 2010

(54) METHOD AND APPARATUS FOR TRANSMITTING AND RECEIVING DATA OVER A SHARED ACCESS CARRIER NETWORK

(75) Inventor: Christopher J. Stone, Newtown, PA (US)

(73) Assignee: General Instrument Corporation, Horsham, PA (US)

( * ) Notice: Subject to any disclaimer, the term of this patent is extended or adjusted under 35 U.S.C. 154(b) by 549 days.

(21) Appl. No.: 11/152,764

(22) Filed: Jun. 14, 2005

(65) Prior Publication Data

US 2006/0280197 A1 Dec. 14, 2006

(51) Int. Cl.
*H04L 12/26* (2006.01)
(52) U.S. Cl. ...................................... 370/465
(58) Field of Classification Search ................. 370/437, 370/229, 461, 294, 465
See application file for complete search history.

(56) References Cited

U.S. PATENT DOCUMENTS

| | | | | |
|---|---|---|---|---|
| 6,061,668 | A | 5/2000 | Sharrow ..................... 705/400 |
| 6,704,317 | B1 | 3/2004 | Dobson ...................... 370/401 |
| 6,760,313 | B1* | 7/2004 | Sindhushayana et al. .... 370/252 |
| 2002/0019875 | A1 | 2/2002 | Garrett et al. ............... 709/230 |
| 2002/0062394 | A1 | 5/2002 | Bunn et al. .................. 709/246 |
| 2002/0065907 | A1 | 5/2002 | Cloonan et al. ............. 709/223 |
| 2002/0073432 | A1 | 6/2002 | Kolze ......................... 725/111 |
| 2002/0080868 | A1* | 6/2002 | Bunn et al. ................. 375/222 |
| 2002/0086641 | A1 | 7/2002 | Howard ..................... 455/67.1 |
| 2002/0157110 | A1* | 10/2002 | Amshoff et al. ............. 725/111 |
| 2003/0021237 | A1 | 1/2003 | Min et al. .................... 370/252 |
| 2003/0058862 | A1 | 3/2003 | Lansing et al. .............. 370/392 |
| 2003/0103527 | A1 | 6/2003 | Beser ......................... 370/468 |
| 2003/0206559 | A1* | 11/2003 | Trachewsky et al. ........ 370/509 |
| 2004/0006771 | A1 | 1/2004 | Dale et al. ................... 725/111 |
| 2004/0085915 | A1 | 5/2004 | Gronau et al. .............. 370/282 |
| 2004/0085976 | A1 | 5/2004 | Dale et al. ................... 370/411 |
| 2004/0087214 | A1 | 5/2004 | Cho ........................... 439/638 |
| 2004/0203392 | A1 | 10/2004 | Hsu et al. ..................... 455/62 |
| 2005/0005154 | A1* | 1/2005 | Danforth et al. ............ 713/200 |
| 2005/0034159 | A1 | 2/2005 | Ophir et al. .................. 725/78 |
| 2005/0038875 | A1 | 2/2005 | Park .......................... 709/219 |
| 2005/0055472 | A1 | 3/2005 | Krzyzanowski et al. ....... 710/5 |
| 2005/0096753 | A1 | 5/2005 | Arling et al. ................ 700/11 |
| 2007/0136743 | A1* | 6/2007 | Hasek et al. ................. 725/33 |
| 2007/0195824 | A9* | 8/2007 | Chapman et al. ............ 370/490 |

\* cited by examiner

*Primary Examiner*—Melvin Marcelo
(74) *Attorney, Agent, or Firm*—Stewart M. Wiener

(57) ABSTRACT

A method for transmitting and receiving data over a shared access carrier network with a plurality of user devices is provided. The user devices each have a modem associated therewith and a network interface for communicating over a local network. The method begins by transmitting a query from each one of the user devices over the local network requesting remaining ones of the plurality of user devices to specify available resources pertaining to shared access carrier network connectivity capabilities of the modem associated therewith. A reply is received over the local network in response to the query from each of the remaining user devices. Based on the replies from each of the remaining user devices, at least one of the user devices is selected to serve as a master device that provides connectivity to the shared access carrier system through which the other of the plurality of user devices transmit and receive data.

14 Claims, 5 Drawing Sheets

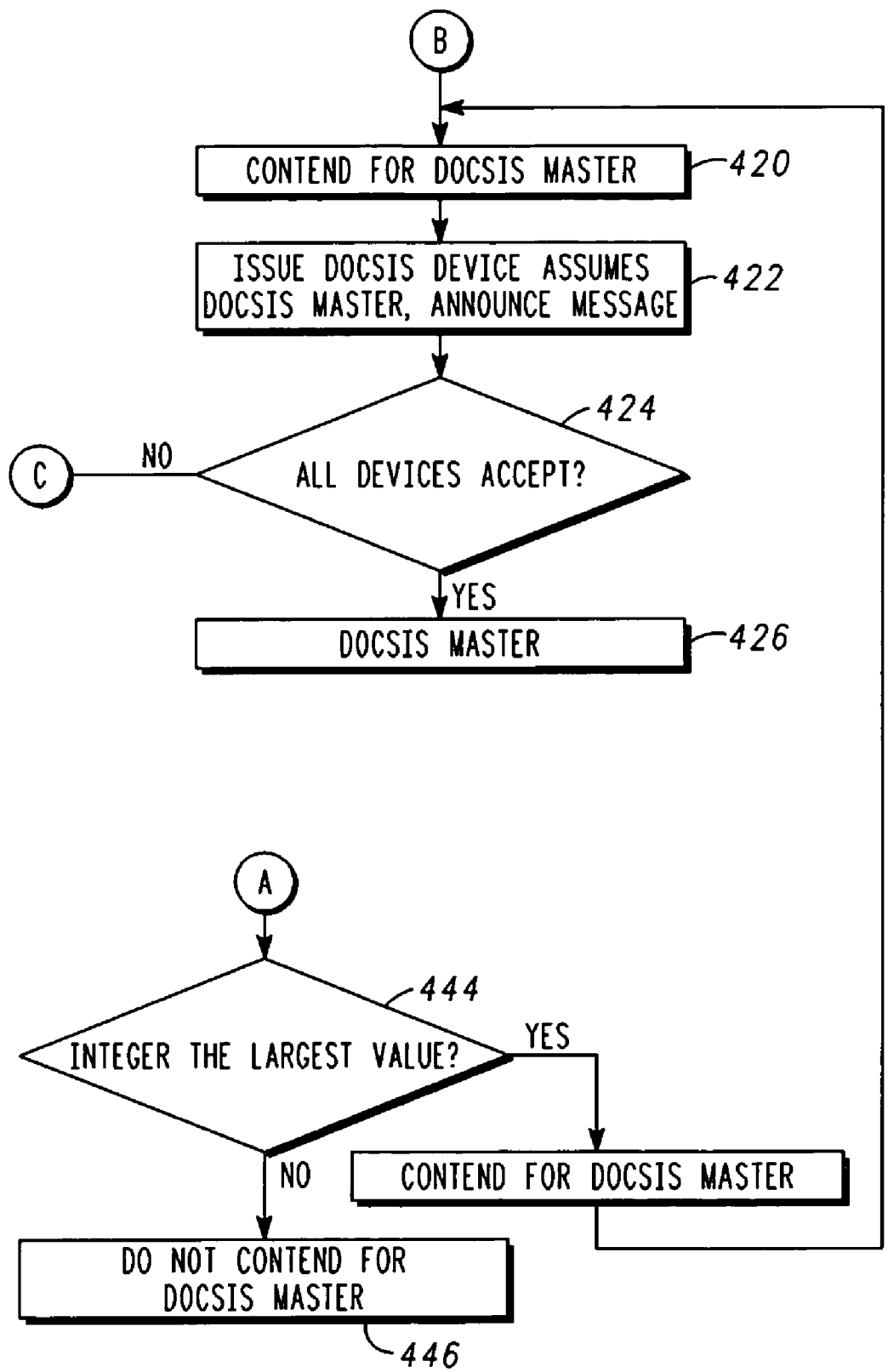
FIG. 4, Cont.

METHOD AND APPARATUS FOR TRANSMITTING AND RECEIVING DATA OVER A SHARED ACCESS CARRIER NETWORK

FIELD OF THE INVENTION

The present invention relates generally to shared access carrier networks, and more particularly to a DOCSIS compliant shared access network such as a hybrid fiber coaxial network.

BACKGROUND OF THE INVENTION

A carrier network generally refers to a computer network through which users communicate with various service providers (e.g. Internet web servers). Carrier networks include "Shared Access Carrier Networks," in which data of multiple users are conveyed together over a shared communications medium between the users and an intermediate network. One of the most prevalent Shared Access Carrier Networks today is found in the Data-Over-Cable (DOC) Network, which includes traditional networks constructed from coaxial cable and hybrid fiber coaxial (HFC) networks constructed with both fiber optical cabling and coaxial cable. Other Shared Access Carrier Networks include wireless and digital subscriber line (xDSL) networks (the xDSL lines typically being aggregated onto an oversubscribed backhaul trunk into the Intermediate Network, with the trunk defining the shared communications medium).

In conventional shared access carrier networks such as a hybrid fiber coaxial (HFC) network, a bidirectional communication path is maintained between a network headend and each remote point in the network. The communication path simultaneously carries broadband radio frequency (RF) signals in two directions on the same medium by dividing the frequency spectrum of the bidirectional communication path. Frequency division multiplexing (FDM) allows two or more simultaneous and continuous channels to be derived from a shared access transmission medium. FDM assigns separate portions of the available frequency spectrum to the "downstream" or "forward path" direction from a headend signal source to a plurality of remote points, and a second frequency range for carrying signals in the "upstream" or "return path" direction from each remote point to the headend.

For example, a conventional cable modem system provides a point-to-multipoint topology for supporting data communication between a cable modem termination system (CMTS) at a cable headend and multiple cable modems (CMs) at the customer premises. In such systems, information is broadcast on downstream channels from the CMTS to the cable modems as defined in DOCSIS in accordance with a time division multiplexing (TDM) technique. In contrast, information is transmitted upstream from each of the cable modems to the CMTS on the upstream channels as short burst signals in accordance with a time domain multiple access (TDMA) technique. The upstream transmission of data from the cable modems is managed by the CMTS, which allots to each cable modem specific slots of time within which to transfer data.

Network carriers and their equipment providers have adopted industry standards in order to increase interchangeability and reduce manufacturing costs for network hardware. For example, DOC carriers have adopted industry standards such as the Data Over Cable Service Interface Specification (DOCSIS). DOCSIS version 1.0 was issued in 1997 with hardware devices being certified starting in 1999. DOCSIS version 1.1 replaced version 1.0 in 1999-2001 and now accounts for the bulk of installed DOC network equipment. Although released, DOCSIS version 2.0 is not yet widely available. As a result, networks conforming to DOCSIS (i.e. DOCSIS-compliant) use DOCSIS version 1.1 hardware in most cases. In part, DOCSIS sets forth requirements and objectives for various aspects of cable modem systems including operations support systems, management, data interfaces, as well as network layer, data link layer, and physical layer transport for data over cable systems.

Since the number of upstream time slots available in a DOCSIS compliant shared access carrier system is limited, the number of cable modems that can register and communicate over the system is also limited. In part as a result of the continuing rapid growth of the Internet and the need for broadband access to it, the number of cable modems seeking access to the shared access carrier system can readily exceed the available resources of the system.

DETAILED DESCRIPTION

The present invention provides a method and apparatus for more efficiently using certain resources of a shared access carrier network such as a cable modem system, a HFC network, a wireless network and a digital subscriber line (xDSL) network. In particular, the present invention reduces the number of upstream time slots that are needed by multiple cable modems (CMs) that are interconnected with one another over a local area network (LAN). In one embodiment of the present invention the carrier network is a DOCSIS compatible cable modem system. More specifically, in order to appreciate the advantages of the present invention, it will be beneficial to describe the invention in the context of an exemplary cable modem system, such as a hybrid fiber coaxial (HFC) network, for example. Description in these terms is provided for convenience only. It is not intended that the invention be limited to application in this exemplary environment. Based on the teachings provide herein, persons skilled in the art will be able to implement the invention in alternative environments.

Figure 1:
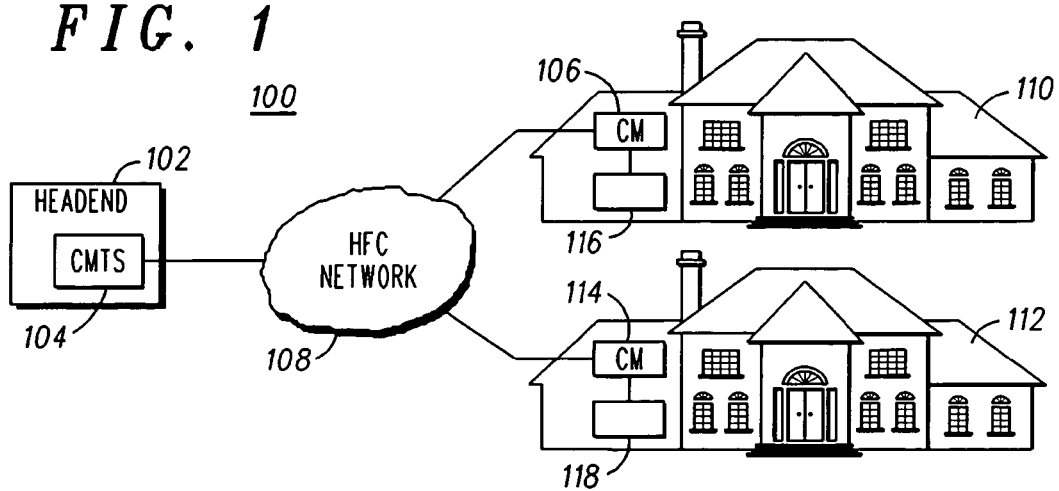
FIG. 1 shows a block diagram of one example of a cable modem system in which embodiments of the present invention may operate.

A block diagram of one example of a cable modem system in which embodiments of the present invention may operate is depicted in FIG. 1. The exemplary DOCSIS-compatible network 100 includes a headend 102 having a cable modem termination system (CMTS) 104 located at a cable company facility. Each subscriber, such as subscribers 110 and 112, has customer premises equipment (CPE), such as a cable modems 106 and 114, connected to the headend 102 via a hybrid fiber coaxial (HFC) network 108. While FIG. 1 shows each subscriber as having a single CM and single CPE, the present invention, encompasses a system that includes any additional number of CMs and/or CPEs. The cable modems 106 and 114 may be stand-alone devices (in which case they may be in further communication with a computer such as personal computer 116) or they may be incorporated in a device such as a set-top box (in which case they may be in further communication with a display device such as television display 118). The CMTS 104 is the portion of the cable headend 102 that manages the upstream and downstream transfer of data between the cable headend 102 and the cable modems 106 and 114, which are located at the subscriber premises. The CMTS 104 broadcasts information downstream to the cable modems 106 and 114 as a continuous transmitted signal in accordance with a time division multiplexing (TDM) technique. Additionally, the CMTS 104 controls the upstream transmission of data from the cable modems 106 and 114 to itself by assigning to each cable modem 106 and 114 short grants of time within which to transfer data. In accordance with this time domain multiple access (TDMA) technique, each cable modem 106 and 114 may only send information upstream as short burst signals during a transmission opportunity allocated to it by the CMTS 104.

The HFC network 108 provides a point-to-multipoint topology for the high-speed, reliable, and secure transport of data between the cable headend 102 and the cable modems 106 and 114 at the customer premises. As will be appreciated by persons skilled in the relevant art(s), the HFC network 108 may comprise coaxial cable, fiberoptic cable, or a combination of coaxial cable and fiberoptic cable linked via one or more fiber nodes.

Each of the cable modems 106 and 114 operates as an interface between the HFC network 108 and at least one attached user device such as the aforementioned computer and television display. In particular, the cable modems 106 and 114 perform the functions necessary to convert downstream signals received over the HFC network 108 into IP or other protocol data packets for receipt by an attached user device. Additionally, the cable modems 106 and 114 perform the functions necessary to convert IP data packets received from the attached user device into upstream burst signals suitable for transfer over the HFC network 108. In the exemplary cable modem system 100, each cable modem 106 and 114 is shown supporting only a single user device for clarity. In general, however, each cable modem 106 and 114 is capable of supporting a plurality of user devices for communication over the cable modem system 100.

In the exemplary cable modem system 100, cable modems 106 and 114 represent conventional DOCSIS-compliant cable modems. In other words, cable modems 106 and 114 transmit data packets to the CMTS 104 in formats that adhere to the protocols set forth in the DOCSIS specification. Furthermore, the CMTS 104 operates to receive and process data packets transmitted to it in accordance with the protocols set forth in the DOCSIS specification. The goal of DOCSIS is to define a data service that will allow transparent bi-directional transfer of Internet Protocol (IP) traffic between the CMTS and subscriber locations using the cable modems over an all-coaxial or hybrid-fiber/coax (HFC) cable network such as depicted in FIG. 1.

The DOCSIS Media Access Control (MAC) sublayer specifies that the CMTS provide a single carrier transmitter for each downstream (i.e. from headend to subscriber) channel. All CMs at subscriber locations listen to all frames transmitted on the downstream channel upon which they are registered and accept those frames where the destinations match the CM itself. CMs can communicate with other CMs only through the CMTS. As detailed below, this limitation can be overcome by the present invention when the CMs can also communicate over a local area network (LAN)

The upstream channel is thus characterized by many transmitters (CMs) and one receiver (the CMTS). Time in the upstream channel is slotted, providing for Time Division Multiple Access at regulated time intervals. The CMTS provides the time reference and controls the allowed usage for each interval. Intervals may be granted for transmissions by particular CMs, or for contention by all CMs. For example, the CMTS may grant some number of contiguous slots to a cable modem for it to transmit data. CMs also may contend to request transmission time. To a limited extent, CMs may also contend to transmit actual data. In both cases, collisions can occur and retries are then used.

The CMTS includes a DOCSIS media access controller (MAC). All of the upstream transmission parameters associated with transmission from the CMs to the CMTS are configurable by the CMTS via the MAC controller. In the DOCSIS standard, the allocation of the entire upstream bandwidth among multiple CM transmitters in both the frequency and time domains is described in a Bandwidth Allocation Map (MAP).

The bandwidth allocation MAP is a MAC Management message transmitted by the CMTS on the downstream channel which describes, for some interval of time, the uses for which the upstream frequency will be employed by a given CM. A given MAP may describe some time slots as grants for particular stations to transmit data in, other time slots as available for contention transmission, and other slots as an opportunity for new stations to join the link. Among other things, the MAP includes a packet header with a number of field descriptors, including a service ID (SID), which is a unique identifier assigned to each of the CMs. It is this field descriptor that the present invention allows to be used in a more efficient manner. Accordingly, by conserving the number of SIDs, the present invention allows many more CMs to communicate over the shared access network before hardware capacity needs to be upgraded. Moreover, the present invention allows a CM to communicate directly with another CM without using the CMTS as an intermediary, thereby further conserving network resources. Also, because fewer SIDs are needed, the need for the CMs to contend for transmission time is reduced, thereby reducing the likelihood of collisions.

In a conventional arrangement, the number of CMs that can communicate over the cable modem system 100 is constrained by the number of upstream channels that are available. That is, the cable modem system 100 has only a limited number of SIDs available. Any additional increase in the number of available SIDs requires the multi-service operator ("MSO") to provide additional hardware or hardware upgrades so that additional CMs can register onto the cable modem system. For a variety of reasons, however, there is a continuing need to increase the number of CMs that can access the system. This need can be difficult to satisfy because of the limited number of available SIDs.

One reason for the rapid growth in the number of CMs accessing the cable modem systems arises from the number of CMs that are now often located in a single subscriber residence. For example, many residences have multiple set-top boxes, each containing a CM, which are used to receive, for instance, CATV broadcasts over an HFC network of the type depicted in FIG. 1. In addition, as the Internet continues to grow and become more pervasive in homes, more and more consumer products are expected to be connected to the Internet and interconnected with one another over local area networks (LANs). As detailed below, the present inventor has recognized that the number of SIDs required by any given residence or other location having multiple cable modems can be reduced if the cable modems are also interconnected with one another over another computer network such as a LAN.

Figure 2:
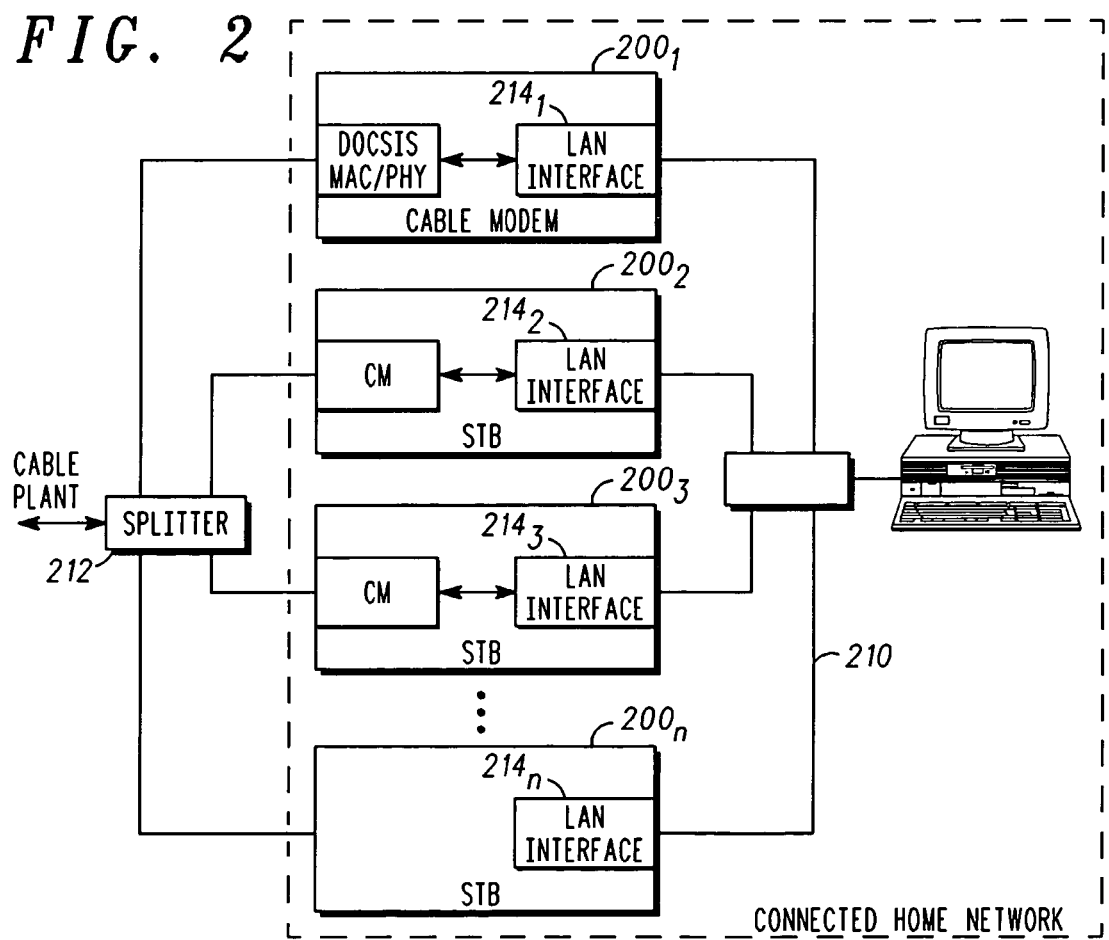
FIG. 2 shows a residential or other networked system that includes multiple networked devices connected to one another through a computer network in accordance with the present invention.

FIG. 2 shows a residential or other networked system that includes multiple user or networked devices $200_1$, $200_2$, $200_3$, ... $200_n$, which are connected to one another through a network 210. Some of the networked devices, such as networked device $200_2$ and $200_3$, for example, incorporate a cable modem. As previously mentioned, such devices could be set-top boxes that receive CATV broadcasts over the HFC network. In other cases, the user or networked devices, such as networked device $200_1$, for example, are stand-alone cable modems. In yet other cases, the networked devices, such as networked device $200_n$, for example, are other devices that communicate over network 210 but which do not include a cable modem. The cable modems associated with networked devices $200_1$, $200_2$, and $200_3$ are all connected to the shared access carrier network (e.g., HFC network 108 shown in FIG. 1) via an RF splitter 212 that splits the signal coming from and to the shared access system. In addition, the set-top boxes that do not include a cable modem, such as set-top box $200_n$ in FIG. 2, receive digital broadcasts over the shared access carrier network by conventional means using, for example, SCTE 55-1 or 55-2.

Most generally, networked devices $200_1$, $200_2$, $200_3$, ... $200_n$ may include one or more general-purpose computers (e.g., personal computers), one or more special-purpose computers, or a combination of one or more general-purpose computers and one or more special-purpose computers. Other examples of networked devices include, without limitation, set-top boxes, personal computers, data terminal equipment, telephony devices, broadband media centers or players, servers, game consoles as well as appliances (e.g., refrigerator, microwave, and oven) and intelligent household devices (e.g., thermostats, security systems, HVAC systems, television equipment and stereo and other audio systems) that include a networked processor.

Figure 5:
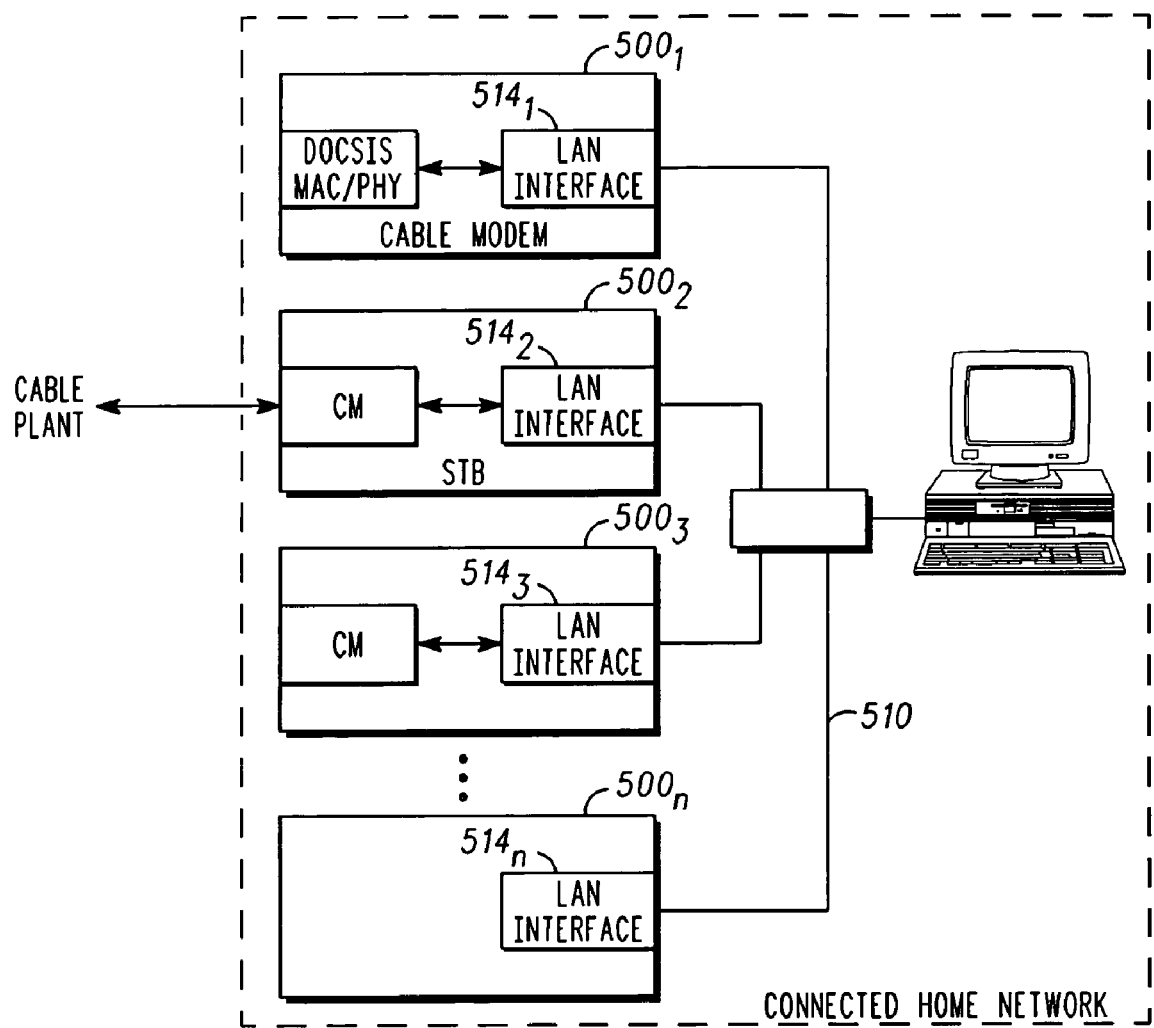
FIG. 5 shows an alternative embodiment of the residential or other networked system depicted in FIG. 2.

FIG. 5 shows one alternative embodiment of the networked system of FIG. 2 in which only a single networked device (e.g., networked device $500_2$) is connected to the shared access carrier system, thereby eliminating the need for splitter 212 in FIG. 2. Such an arrangement may be particularly suitable when only one of the networked devices is a set-top box and thus is the only device that might need a direct connection to the shared access carrier system in order to received video broadcasts in accordance with SCTE 55-1 or 55-2. The remaining networked devices (e.g., networked devices $500_1$, $500_3$ and $500_n$) may be stand-alone CMs, appliances or intelligent household devices, for example, in which case they do not need the direct connection to the shared access carrier system. Of course, in other embodiments of the invention, such as those having two set-top boxes and one or more additional networked devices, for example, it may be advantageous to employ a splitter such as splitter 212 so that both set-top boxes can be directly connected to the shared access carrier network. The additional networked device or devices would of course not need such a direct connection.

Network 210 may be a Local Area Network (LAN) that employs a wired or wireless transmission medium, or a combination of both a wired and wireless transmission media. Exemplary types of networks include, without limitation, token ring, Ethernet, Fast Ethernet, Gigabit Ethernet, HomePNA, powerline networking and MoCA. In particular, commonly available high-speed home networking technologies currently include HomePNA 2.0/1.0, legacy Ethernet and 802.11 wireless LAN. These three technologies use a shared media access control method to respectively access the physical layer phone wires, Ethernet cables and wireless media. The networked devices 200 each contain an appropriate LAN interface 214 that is responsible for ensuring the proper flow of data between the networked device and the network. For instance, if the network 210 complies with the IEEE Local Area Network standards, the network interface may a Media Access Control/Physical Layer interface.

As previously mentioned, in a conventional arrangement each of the cable modems located in the networked system is assigned its own SID in order to communicate over the shared access system. In accordance with the present invention, however, only a subset (possibly one) of the cable modems are assigned their own SIDs. The cable modem or modems that are assigned SIDs serve as master devices that provide interactivity to all the other cable modems in the network. One problem that can arise in selecting the cable modem or modems that should serve as a master device is that some of them may be utilizing older DOCSIS hardware (e.g., DOCSIS 1.1) while others may be utilizing more current DOCSIS hardware (e.g., DOCSIS 2.0). If a cable modem that is compliant with an older DOCSIS standard is selected as the master device, the MSO could be prevented from upgrading their DOCSIS infrastructure. Additionally, the remaining networked devices that do not incorporate a master device will not be able to utilize the full functionality supported by the current DOCSIS standard. Accordingly, in some embodiments of the invention, discussed below, the master device(s) is selected so that all the networked devices can avail themselves of all the DOCSIS functionality that is available.

In accordance with the present invention, the network 210 is used as a signaling mechanism by the various networked devices to determine the existence of DOCSIS compliant cable modems. Once these devices are identified, further signaling is employed over the network 210 to determine which of those networked devices offer enhanced functionality (e.g., which support the most current version of DOCSIS). Once these capabilities have been identified and exchanged among themselves, the networked devices determine which of them should serve as a master device.

Any of a variety of different criteria may be employed to determine which networked device or devices should serve as a master device. For example, in one case the networked device that is compliant with the most current version of DOCSIS may be selected as a master device. In addition to DOCSIS capability, other factors such as the data throughput of the LAN interface associated with the networked device may also be taken into account when selecting a master device. For instance, it will generally be preferable to select as the master device a networked device that has a LAN interface with the highest data throughput. If multiple devices meet this criterion, then any appropriate process may be used to select among them. For instance, the networked devices can generate a random integer between, say 1 and 1000 and the device that generates the lowest (or highest) integer would assume the role of the master device. In some cases, however, it may be desirable to have more than one master device. For example, an additional master may be dynamically allocated to compensate for throughput requirements than a single master device cannot satisfy.

Figure 3:
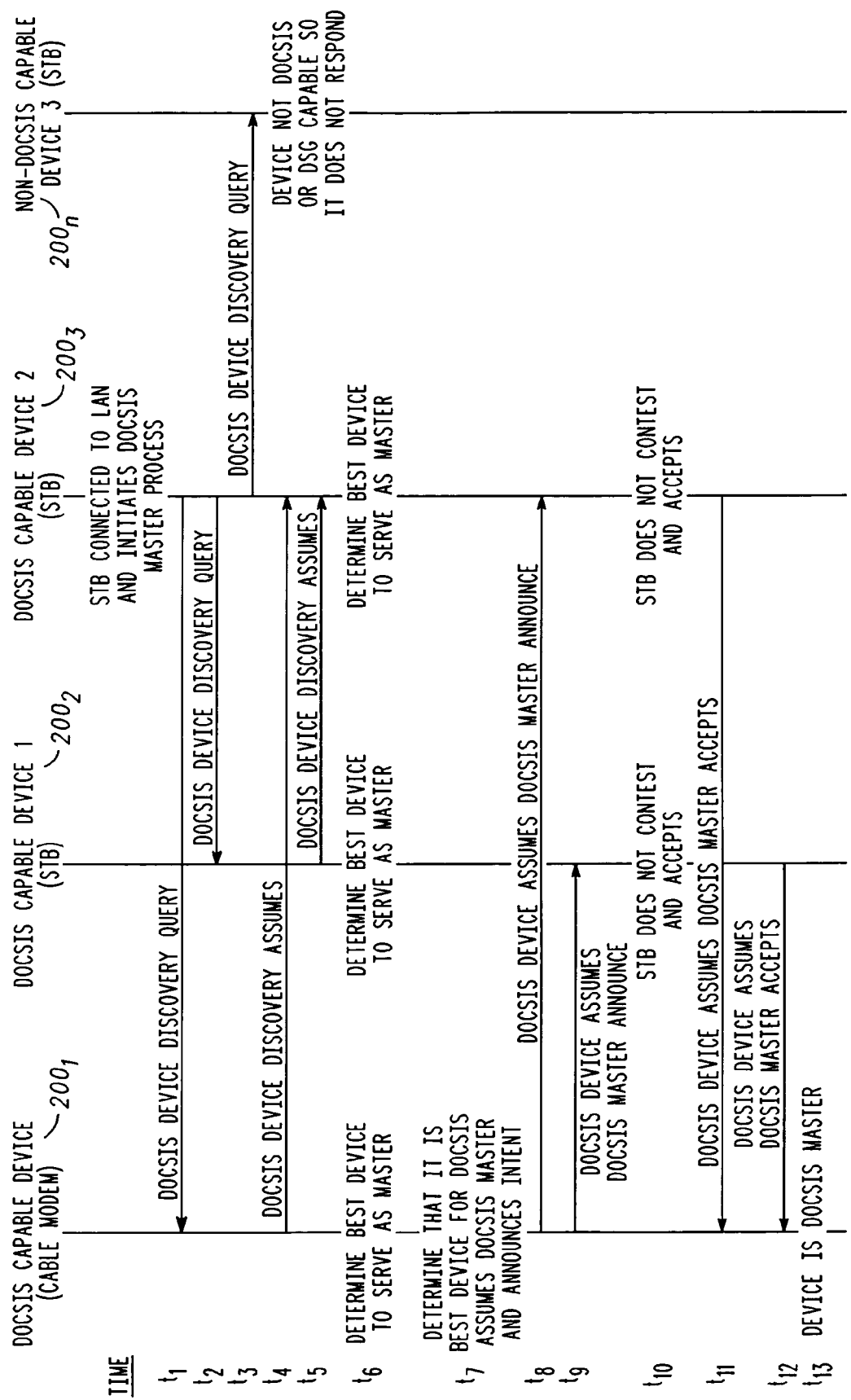
FIG. 3 is a protocol flow that shows the messages that are exchanged over the computer network in accordance with the present invention to determine which of the networked devices should serve as a master device.

FIG. 3 is a protocol flow that shows the messages that are exchanged over the network 210 to determine which of the networked devices are DOCSIS compliant and then to determine which of those networked devices should serve as a master device. For purposes of illustration only and not as a limitation on the invention the network devices are assumed to be those four devices depicted in FIG. 2 and which have the following capabilities: networked device $200_1$ is DOCSIS 2.0 compliant, networked devices $200_2$ and $200_3$ are both DOCSIS 1.1 compliant, and networked device $200_n$ is not DOCSIS compliant. Also, the LAN interfaces 214 are all assumed to be 10/100 Base-T compliant. Furthermore, in this example set-top box $200_3$ is assumed to initiate the discovery process. Of course, this process could be initiated by any of the networked devices that include a cable modem connected to the shared access network.

The method begins at time $t_1$ when networked device $200_3$ transmits a message to one of the other devices (e.g., network device $200_1$) that queries the other device as to the capabilities of its cable modem. The format of the message will be dependent on the particular LAN or other network configuration that is employed. Additionally, most current DOCSIS compliant set-top boxes employ well-known messaging protocols to broadcast their DOCSIS capabilities. Those that do not employ such messaging protocols generally can be provided with this capability by a firmware or software upgrade. Likewise, at times $t_2$ and $t_3$ the networked device $200_3$ transmits a similar message to the remaining networked devices $220_2$ and $220_4$, respectively. In some cases the networked device may broadcast the message to all the other networked devices, in which case the times $t_1$-$t_3$ will all be simultaneous. At times $t_4$ and $t_5$ networked devices $200_1$ and $200_2$, respectively, respond to the device discovery query. Networked device $200_4$ does not respond since it does not incorporate a DOCSIS compliant cable modem. At time $t_6$ the networked devices $200_1$ and $220_2$ and $200_3$ each compare the information they have received and determine which among them is the best device to serve as the master. The process by which the networked devices determine which among them should serve as the master is depicted in more detail in FIG. 4, which will be described below. In this case the networked device $200_1$ determines at time $t_7$ that since it is DOCSIS 2.0 compliant it is best suited to serve as the master device and announces its intent by sending messages to networked devices $200_3$ and $200_4$ at times $t_8$ and $t_9$, respectively. Networked devices $200_2$ and $200_3$ do not contest the determination of networked device $200_1$ and accept it as the DOCSIS master device by transmitting acknowledgement messages at times $t_{11}$ and $t_{12}$, respectively. Finally, at time $t_{13}$ networked device $200_1$ assumes the role of master device.

Once a networked device has been designated as the DOCSIS master, the remaining networked devices that include a CM internally reconfigure themselves to disable their CMs. In effect, these remaining devices each simply become a CPE that is slaved to the master device. Likewise, the master device internally reconfigures itself to allow for as many CPE connections as there are slaved devices. Conventionally, for example, a DOCSIS compliant CM in a set-top box has only a single CPE connection. Accordingly, the number of CPE connections provided by a set-top box that serves as the master device will need to increase as the number of slaved devices increases. Those networked devices that do not include a CM will simply be treated as a CPE or slave by the master device. As used herein, a slave or slaved device refers to a device that is capable of registering with the CMTS but does not do so; instead, traffic associated with the device is routed through the master device.

Figure 4:
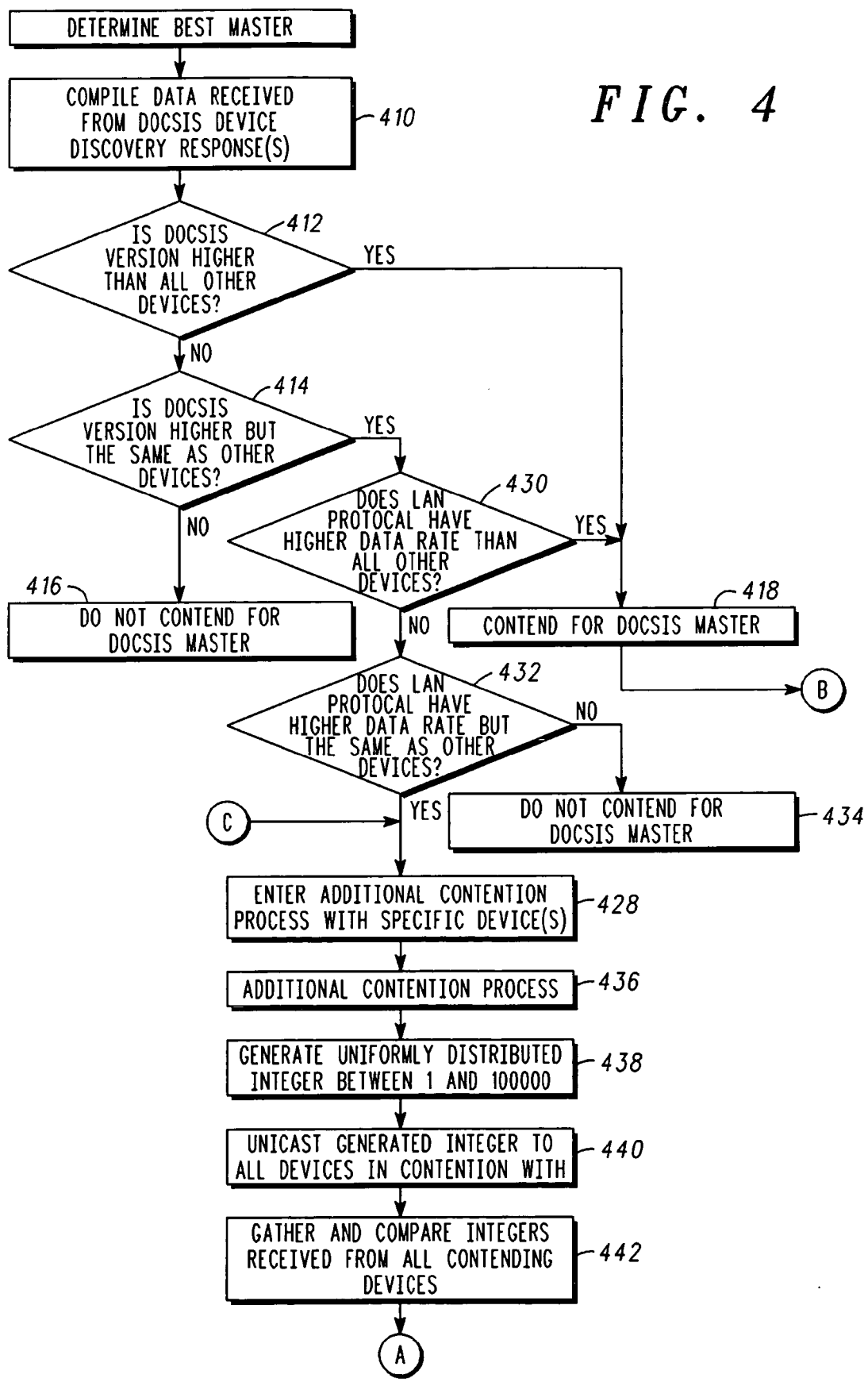
FIG. 4 is a flowchart showing one embodiment of the process by which any of the networked devices determine which among them should serve as the master device.

FIG. 4 is a flowchart showing one embodiment of the process by which any of the networked devices determine which among them should serve as the master device. That is, the process depicted in FIG. 4 corresponds to the steps that occur at times $t_6$ and $t_7$ in the protocol flow of FIG. 3. The process begins at block 410, where each networked device compiles the data it has received from the other network devices concerning the DOCSIS capabilities of their respective cable modems. Next, at block 412 the networked device determines if it employs a DOCSIS version higher than that employed by the other networked devices. If it does not, then the process continues at block 414, where the networked device determines if its DOCISIS version is the same as that of any other networked devices. If it does not, then the process terminates at step 416 with the network device concluding that it should not contend for the role of the master device.

If, on the other hand, at block 412 the networked device concludes that it does employ a DOCSIS version higher than the other networked devices, then it determines at block 418 that it should contend for the role of master device at block 420. In this case the networked device at block 422 broadcasts a message over the network 210 indicating that it is assuming the role of master device. If at block 424 none of the remaining networked devices contend, then the networked device assumes the role of master at block 426 and the process is terminated. In accordance with FIG. 3, the device assuming the role of master will transmit an acknowledgement message. If, however, at block 424 one or more of the networked device contend for the role of master device, then a contention sub-process begins at block 428.

Before describing the contention sub-process, returning to block 414, if the networked device does in fact have the same DOCSIS version as one or more of the other networked devices, then it further determines at block 430 if its network interface has a higher data rate than the network interface of the remaining networked devices. If it does have a higher data rate, then it continues at block 418 by contending for the role of master device in the manner described above. If, however, the networked device does not have a network interface with as high a data rate, then it determines at block 432 if it has a network interface with the same data rate as any of the other networked devices. If it does not, then it concludes at block 434 that it should not contend for the role of master device. If it does have both the same DOCSIS version and the same interface data rate as one of the other networked devices, then a determination is made at block 428 to begin a contention sub-process.

As indicated at block 436, a contention sub-process is begun for each and every networked device that has either determined at block 422 it should assume the role of master or determined at block 432 that it should contend for the role of master. Each of the networked devices contending for the role of master selects at block 438 an integer between, say 1 and 100,000. The selected integer at block 440 is then transmitted over the network 210 to the remaining devices that are contending for the role of master. At block 442 the contending networked devices each compare the integer it has selected with the integer selected by the other contending devices. If the contending device concludes at block 444 that it that has selected the largest (or smallest) integer, then it will continue to contend for the role of master device at block 420 in the manner discussed above. If the contending device concludes at block 444 that it has not selected the largest (or smallest) integer, then it concludes at block 446 that it should no longer contend for the role of master device.

The invention claimed is:

1. A method for transmitting and receiving data over a shared access carrier network with a plurality of user devices that each have a modem associated therewith and a network interface for communicating over a local network, comprising:

transmitting a query from each one of the user devices over the local network requesting remaining ones of the plurality of user devices to specify available resources pertaining to shared access carrier network connectivity capabilities of the modem associated therewith;

receiving a reply over the local network in response to the query from each of said remaining user devices; and based on the replies from each of said remaining user devices, selecting at least one of the user devices to serve as a master device that provides connectivity to the shared access carrier system through which the other of the plurality of user devices transmit and receive data.

2. The method of claim 1 wherein said shared access carrier network and said modems conform to an interface specification standard and said shared access carrier network connectivity capabilities of the modem are defined at least in part by the interface specification standard.

3. The method of claim 2 wherein said interface specification standard is DOCSIS.

4. The method of claim 2 wherein the selecting of the master device further comprises comparing versions of the interface specification standard employed by the user devices.

5. The method of claim 1 wherein at least two of the user devices have substantially the same available resources pertaining to the shared access carrier network connectivity capabilities and further comprising the step of performing a contention process between said at least two user devices to determine which of said at least two user devices is to serve as the master device.

6. The method of claim 1 wherein said user devices that are not serving as the master device disable their applicable resources that provide the shared access carrier network connectivity capabilities.

7. The method of claim 1 wherein said query further requests each of the remaining ones of the plurality of user devices to also specify data throughput of the network interface associated therewith.

8. The method of claim 1 wherein said local network comprises one or more network types selected from the group consisting of token ring, Ethernet, Fast Ethernet, Gigabit Ethernet, HomePNA, powerline networking, MoCA and IEEE 802.11.

9. The method of claim 1 wherein said shared access carrier network is a cable modem system.

10. The method of claim 1 further comprising:
establishing communications over the local network between the master device and a slave comprising another one of the plurality of user devices;
receiving over the local network from the master device downstream data received by the master device from the shared access carrier network, said downstream data to be directed to the slave; and
transmitting from the slave to the master device over the local network upstream data to be forwarded by the master device to the shared access carrier network.

11. The method of claim 1 wherein the master device employs a version of an interface specification standard more current than the interface specification standard employed by a slave device.

12. At least one computer-readable medium encoded with instructions which, when executed by a processor, perform a method for transmitting and receiving data over a shared access carrier network with a plurality of user devices that each have a modem associated therewith and a network interface for communicating over a local network including the steps of:

transmitting a query from each one of the user devices over the local network requesting remaining ones of the plurality of user devices to specify available resources pertaining to shared access carrier network connectivity capabilities of the modem associated therewith;

receiving a reply over the local network in response to the query from each of said remaining user devices; and based on the replies from each of said remaining user devices, selecting at least one of the user devices to serve as a master device that provides connectivity to the shared access carrier system through which the other of the plurality of user devices transmit and receive data.

13. The computer-readable medium of claim 12 further encoded with instructions which, when executed by the processor, perform the steps of:
establishing communications over the local network between the master device and a slave comprising another one of the plurality of user devices;
receiving over the local network from the master device downstream data received by the master device from the shared access cater network, said downstream data to be directed to the slave; and
transmitting from the slave to the master device over the local network upstream data to be forwarded by the master device to the shared access cater network.

14. The computer-readable medium of claim 12 wherein the master device employs a version of an interface specification standard more current than the interface specification standard employed by a slave device.

* * * * *